Patented Dec. 18, 1951

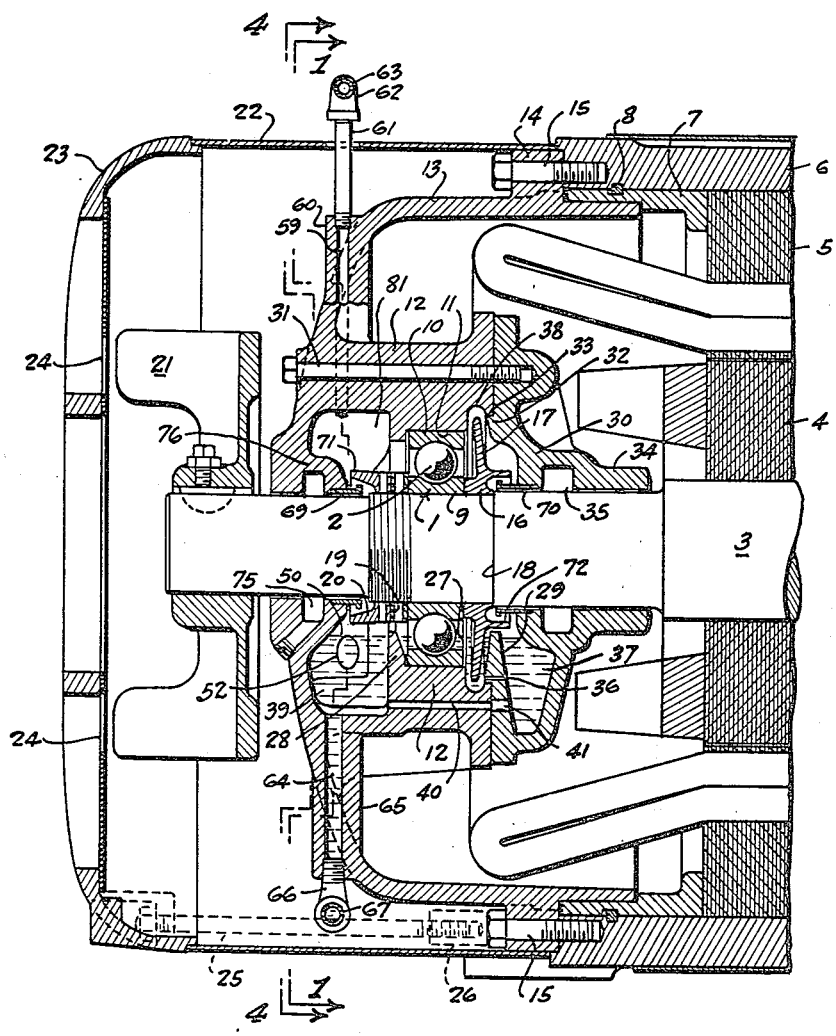

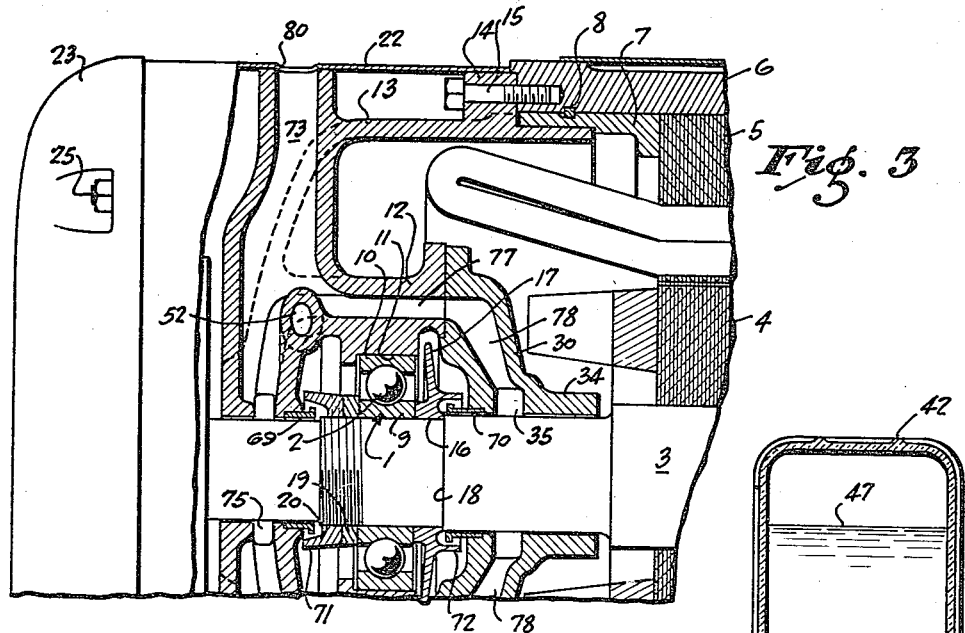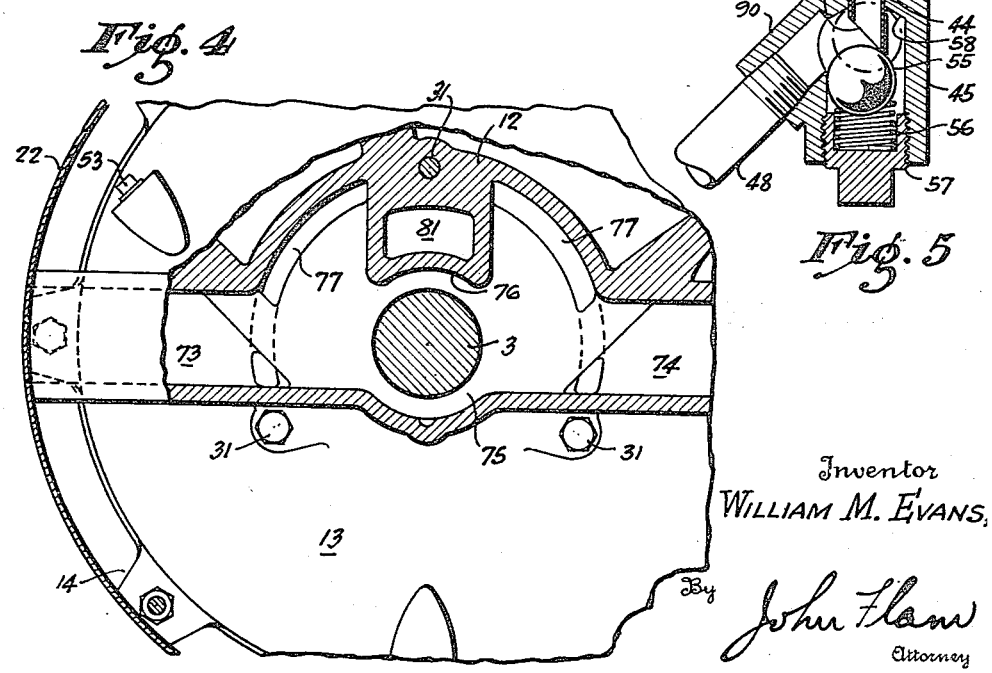

2,579,039

UNITED STATES PATENT OFFICE 2,579,039

LUBRICATING SYSTEM

William M. Evans, Inglewood, Calif., assignor to U. S. Electrical Motors, Inc., Los Angeles, Calif., a corporation of California Original application May 17, 1943, Serial No. 487,270. Divided and this application April 3, 1948, Serial No. 18,733

6 Claims. (Cl. 184—103)

This invention relates to the lubrication of shafts.

The present invention is a division of my application for "Lubricating System," Serial No. 487,270, filed May 17, 1943, now Patent No. 2,500,454.

It is advantageous to provide an oil well adjacent the bearing that is to be lubricated. For example, a shaft having an axis arranged in a substantially horizontal position may be lubricated by passing oil upwardly from a well located below the shaft. For this purpose, oil rings or analogous devices have been used. All of them, however, require that the level of the lubricant in the well be maintained at a satisfactory point.

It is one of the objects of this invention to ensure that the lubricant level be maintained in a well even when the shaft axis may vary from a desired normal position. Thus, for example, even if a normally horizontal shaft be tilted considerably from that position, the distance from the axis of the shaft to the oil level is not materially altered.

Such an assurance for maintaining the oil level constant is especially useful where a continuous flow of oil is provided from the well to the bearings, and back to the well, the rate of oil flow in this cycle being regulated by an oil metering aperture. It is then assured that the circulation of oil is substantially uniformly maintained.

One manner of maintaining the lubricant level in a well substantially constant is to feed the lubricant to the well gravitationally, under vacuum control, from a source above the lubricant level in the well. Reliance is placed on the vacuum above the source to maintain the difference in lubricant levels. Entry of air into the source, or reservoir, upon lowering of the well lubricant level, automatically releases additional lubricant from the reservoir to replenish the well supply.

Opening of the reservoir or its removal, whenever the lubricant requires replenishment, disrupts the vacuum, and allows lubricant in the line between the reservoir and well to elevate the well level above the predetermined point, which may not be desirable.

Accordingly, it is another object of the invention to permit the lubricant reservoir or source to be opened or disconnected from communication with the lubricant well without substantially affecting the liquid level in the well.

This invention possesses many other advantages, and has other objects which may be made more easily apparent from a consideration of one embodiment of the invention. For this purpose there is shown a form in the drawings accompanying and forming part of the present specification. The form will now be described in detail, illustrating the general principles of the invention; but it is to be understood that this detailed description is not to be taken in a limiting sense, since the scope of this invention is best defined by the appended claims.

Referring to the drawings:

Fig. 2 is a longitudinal sectional view, taken along plane 2—2 of Fig. 1;

Fig. 3 is a fragmentary sectional view, taken along plane 3—3 of Fig. 1;

Fig. 4 is a fragmentary sectional view, taken along plane 4—4 of Fig. 2; and

Fig. 5 is an enlarged fragmentary view, illustrating the manner in which a lubricant reservoir may be utilized in connection with the invention.

Figure 1:
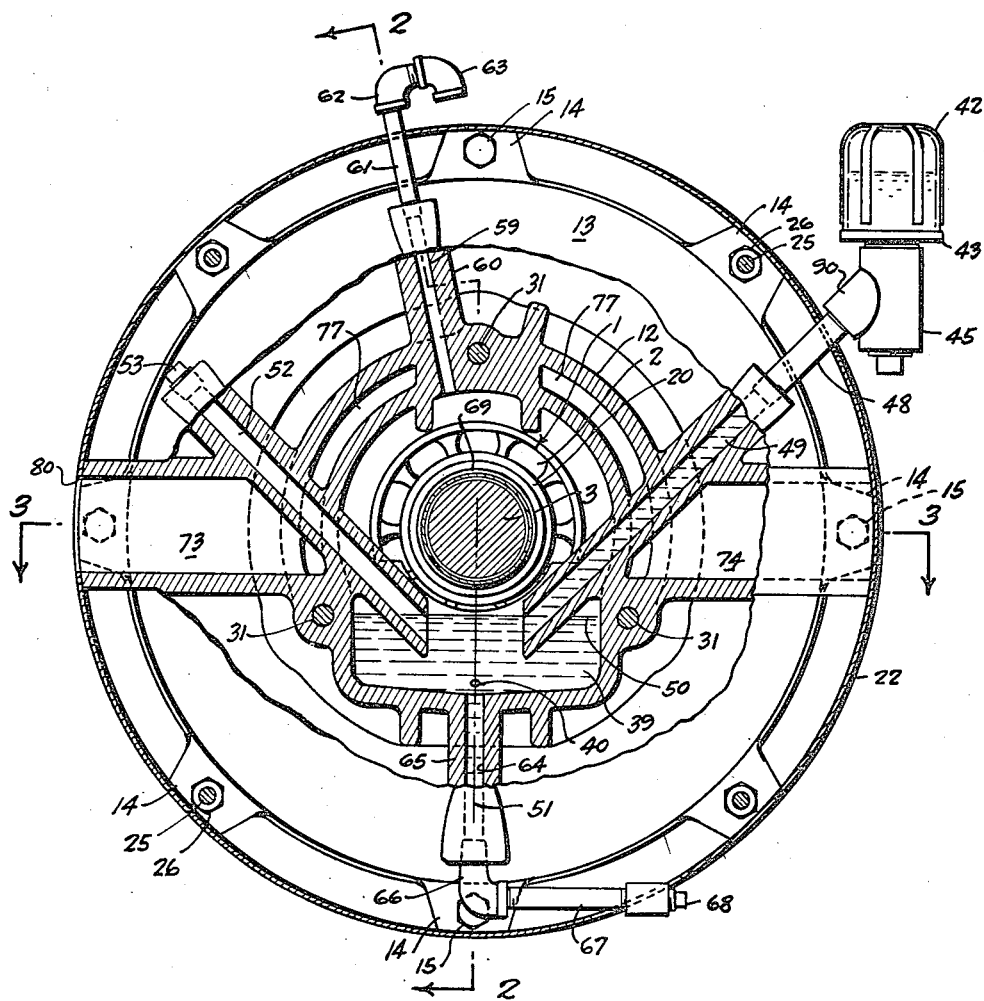
Figure 1 is a partial sectional view, taken substantially along the plane 1—1 of Fig. 2, of a bearing structure and its associated parts, all as incorporating the invention.

In the present instance, a bearing structure 1 (Figs. 1, 2, and 3) is shown as formed of rolling elements, such as the balls 2, for supporting a horizontal shaft 3. This shaft 3 is shown as one that carries an induction motor rotor 4. This rotor 4 is shown as cooperating with a stator 5. Only the left hand bearing support for shaft 3 is shown. It is understood, however, that a bearing support is used at the other end of the shaft.

The stator 5 may be conventionally supported in a motor frame 6. For example, a flange 7 is shown, telescoping within the frame 6 and held in proper relationship to the frame 6, as by the aid of a spring keying ring 8.

The manner in which the bearing structure 1 is supported may now be described. This bearing structure includes the inner race 9, directly mounted on the shaft 3. The outer race 10 is shown as accommodated in a bore 11 (Figs. 1 and 3) formed in a generally cylindrical bearing support 12. This bearing support 12 is shown as being formed integrally with a bearing bracket 13. This bearing bracket 13 is provided with a plurality of ears 14 (see, particularly, Fig. 1) for attaching the bracket 13 to the left hand end surface of the frame 6. This may be accomplished by the aid of the bolts 15.

The inner race 9 of the bearing structure 1 is held in fixed axial position with respect to the shaft 3. Thus, the right hand edge of the race 9 is in contact with the hub 16 (Figs. 2 and 3) of a lubricant distributor 17 to be later described. The hub of this distributor 17 is restrained against movement toward the right, as by the shoulder 18 formed on shaft 3. Urging the inner race 9 toward the right against the hub 16, there are a pair of nuts 19 and 20 which are threaded on the shaft and which may be tightened, as by the aid of a spanner wrench.

For the purpose of providing ventilation and for cooling the electric motor, the extreme left hand end of shaft 3 is shown as carrying a ventilating fan 21 (Fig. 2). A frame or housing is provided for the fan, as by the aid of the sheet metal casing 22 and the cap 23. The sheet metal casing 22 may be arranged to telescope over the ears 14, as shown most clearly in Fig. 1. The cap 23 may be apertured, as indicated at 24, to permit passage of the circulating air into and out of the casing 22. The casing 22 and the end cap 23 may be appropriately held in position, as by the aid of several long bolts 25 (Figs. 1 and 2). These bolts engage in appropriate threaded extensions 26 (Fig. 2) that are formed on the heads of several of the cap screws 15.

Lubrication is supplied to the bearing structure 1 in a manner now to be described. Lubricant, such as the body of oil 27 (Fig. 2), is disposed in a space formed adjacent the lower portion of the race 9. The lubricant level is high enough so that the rolling elements 2 at the lower portion of the race 9 are partly immersed in the lubricant. For this purpose, the bearing support 12 is provided with a wall 28 (Fig. 2) forming the left hand boundary of a space in which the oil 27 is accommodated. A similar wall 29, forming the right hand boundary, is provided on the other side of the bearing structure 1 by a bearing cap 30. This bearing cap 30, as shown most clearly in Figs. 2 and 3, has an end surface contacting the end surface of support 12. It is fastened to the support 12, as by the aid of a plurality of bolts 31 (see also Fig. 1). It also has a portion 32 telescoping into a corresponding bore 33 at the end of the support 12. Hub 34 of the cap 30 surrounds the shaft 3 with a slight clearance to form an oil seal around the shaft, as will be explained hereinafter.

The oil 27 is supplied to the bearing structure 1 through an oil metering aperture 36 disposed in the lower portion of the wall 29. This oil metering aperture 36 communicates with an oil well 37 formed in the lower portion of the bearing cap 30. This metering aperture 36 restricts the rate at which the oil circulates from the well 37 into the space adjacent the lower portion of the race 9, and thence over the wall 29 back into the well 37. This circulation is set up due to the agitation of the oil by movement of the balls 2.

To distribute the oil around the bearing structure 1, use is made of the oil distributor 17. This may be in the form of a ring appropriately fastened to the shaft 3, and having its lower portion extending into the oil 27. As the shaft 3 rotates, oil is carried by the distributor 17 upwardly, and the oil is thrown by centrifugal force toward the walls of the cavity 38, defined by the bearing support 12 and the cap 30, and housing the distributor 17.

The arrangement is such that the level of the oil, or other lubricant, in the well 37 is maintained substantially constant. For this purpose, another oil well 39 (Figs. 1 and 2) is formed in the bearing bracket 13, and is in constant communication with the oil well 37, as by the aid of the apertures 40—41 formed respectively in the support 12 and in the cap 30. The level 50 of the oil in well 39 is kept constant, and therefore the same level is maintained in well 37.

For this purpose, a supply of oil for the well 39 is obtained from a reservoir 42 (Figs. 1 and 5) in an elevated position above the well 39. This reservoir 42 is in the form of a transparent closed plastic container appropriately ribbed for strength. Its lower edge is shown as sealed in an annular groove formed in a metal flange 43. This metal flange 43 also carries the hollow externally threaded stem 44 which is in threaded engagement with a fitting 45. A resilient gasket or seal 46 is disposed between the bottom of the flange 43 and the top of the fitting 45. In this way, when the container 43 is threaded tightly in place, the fitting 45 is sealed against the ingress of air.

Oil, or other lubricant, 47 in the reservoir is in communication through the stem 44 with the hollow projection 90 extending downwardly from the fitting 45. This hollow projection is connected, as by a pipe 48, with a conduit 49. This conduit 49, as shown most clearly in Fig. 1, is formed by walls joined integrally with the bearing bracket 13 and intersecting the support 12. It slopes downwardly and opens within the well 39.

The oil lubricant 47, from the sealed container 42, is free to flow downwardly through the conduit 49 and into the well 39 only until the level 50 of the lubricant in well 39 reaches the top of the opening of the conduit 49 in the well 39. Further passage of lubricant is then prevented because the lower end of the conduit 49 is sealed against entry of air. Then no air can rise through the conduit 49. Therefore, the space above the lubricant 47 in the reservoir, being a partial vacuum, no oil or lubricant in the translucent container 42 flows downwardly. Should the level 50 recede, however, at least a portion of the lower end of the conduit 49 is exposed, permitting air to flow up through the conduit 49 into the reservoir 42; and oil can then flow down this conduit until the level 50 is reestablished.

The lower end of the conduit 49 is purposely brought close to the vertical plane 51 that passes through the axis of shaft 3; and the level 50 is established quite close to the axis of the shaft 3. In this way, minor tilting of the lubricant well 39 about the shaft axis has little effect upon the position of the oil level 50 with respect to the shaft axis.

An alternative conduit 52 (Figs. 1 and 3) is provided, symmetrically arranged with respect to the vertical plane 51. In this way, either the conduit 49 or 52 may be used as desired. The conduit that is not in use has its upper end sealed, as by the aid of a conventional pipe plug 53.

Since the reservoir or container 42 is translucent, an operator may readily determine when the lubricant 47 needs replenishing. This replenishment should be accomplished without unsealing the conduit 49 at the top; for, otherwise, the oil filling the conduit 49 would all flow out into the well 39. To prevent such an occurrence, a check valve arrangement is provided, illustrated most clearly in Fig. 5.

Thus, the hollow stem 44 is shown as having a sloping lower surface 54. This sloping lower surface, when the container 42 is screwed into place, serves to urge a ball valve closure 55 downwardly against the force of a compression spring 56. This compression spring 56 is accommodated in the bore of a cap 57. Now, when the container 42 is to be unscrewed to remove it and to fill it again, the spring 56 expands, and the ball check 55 is urged upwardly to the dotted line position. In this position it is seated upon the tapered seat 58 formed around the hollow stem 44. In this way, effective checking action is provided, preventing ingress of air around the fitting 45 while the container 42 is removed.

When the container or reservoir 42 is thus removed, it may be completely refilled with lubricant or oil 47, and then may be rapidly inverted and threaded into place. In the process of screwing it into place, the ball closure 55 is urged downward to the open position illustrated in Fig. 5.

The oil level 50 of the well 39 is exposed to atmospheric pressure. For this purpose use is made of the conduit 59 (Figs. 1 and 2) formed in the boss 60. This boss 60 is shown as integral with the bearing bracket 13. Into its upper end is threaded the pipe 61, provided with appropriate fittings, such as the elbows 62 and 63 for forming the opening to the atmosphere.

Provisions are also made for draining the oil from the lubricant wells 37 and 39. For this purpose a conduit 64 (Figs. 1 and 2) is provided which extends through the boss 65 integral with the bracket 13. Into this conduit 64 is threaded the pipe elbow 66. A drain pipe 67 is accommodated in the elbow 66 and may be closed by the pipe plug 68.

Provisions are made for ensuring that oil from the wells 37 and 39 will not pass outwardly along the shaft 3 in an axial direction. For this purpose, oil sealing sleeves 69 and 70 (Figs. 2 and 3) are carried by the bracket 13 and the cap 30. These sleeves define very narrow annular passageways between the outer cylindrical surface of the shaft 3 and the inner cylindrical surface of the sleeves. Oil that may splash around the shaft is held by capillary attraction in this narrow space. In this way, the oil thus held serves as a seal around the shaft. The space between hub 34 and shaft 3 forms, as heretofore stated, a supplemental oil seal.

The nut 20 may be provided with an overhanging flange 71, and a similar overhanging flange 72 may be carried by the oil distributor 17. These flanges serve to throw outwardly from the shaft 3 any lubricant that may accumulate thereon.

As heretofore stated, a fan 21 is provided for ventilation. This fan creates an air pressure differential through the bearing structure and the bearing bracket 13. This, unless checked, would have the effect of disturbing the oil seals provided by the sleeves 69 and 70. In order to equalize the air pressure on both sides of the seals, use is made of communicating air passageways. These may be best described in connection with Figs. 1, 3, and 4.

The bearing bracket 13 is therefore provided with horizontal conduits 73 and 74 extending radially from the axis of shaft 3. These conduits communicate with the external atmosphere through apertures 80 in the casing 22. These air conduits 73 and 74 are in direct communication with an annular space 75 around shaft 3 and axially spaced to the left from the sleeve 69. This annular space 75 is formed in the bracket 13. It is partially defined by the wall 76 that serves to separate space 75 from the space 81 above oil well 39 in the bracket 13. Passageways 77 (Figs. 1 and 3) extend from conduits 73 through the support 12, communicating with corresponding passageways 78 (Fig. 3) in the bearing cap 30, as well as with the annular space 35 formed in the bearing cap. Accordingly, since this annular space 35 is disposed to the right of the oil seal formed by the sleeve 70, the air pressure at the outward side of the seal is maintained the same as at the outward side of the seal formed by the sleeve 69.

The inventor claims:

1. In a bearing lubricating system: a bearing structure adapted to support a substantially horizontal shaft; means forming a lubricant well below the shaft; a conduit extending upwardly from the well; said conduit having an opening in constant communication with said well; and a sealed lubricant reservoir connected in fluid-tight relation to the top of the conduit; the lower opening of the conduit being thus adapted to determine the level of lubricant in the well, the said lower opening being close to and below the axis of the shaft in order that the said level remains substantially at a constant distance below the shaft axis upon incidental deviation of the well from a desired position.

2. In a bearing lubricating system: a bearing structure adapted to support a substantially horizontal shaft; means forming a lubricant well below the shaft; a conduit extending upwardly from the well; said conduit having an opening in constant communication with said well and a sealed lubricant reservoir connected in fluid-tight relation to the top of the conduit; the lower opening of the conduit being thus adapted to determine the level of lubricant in the well, the said lower opening being disposed close to a vertical plane passing through the shaft axis.

3. In a bearing lubricating system: a bearing structure adapted to support a substantially horizontal shaft; means forming a lubricant well below the shaft; a conduit extending upwardly from the well and having a valve seat at its upper portion; a container adapted to be threadedly engaged into the top of the conduit and sealing off said conduit; and a check valve closure engageable with said seat to close the conduit when the container is removed; said container having a projection extending into the conduit for holding the closure off said seat when said container is threadedly engaged in said conduit.

4. In a bearing lubricating system: a bearing structure adapted to support a shaft; means forming a lubricant well below the shaft; a conduit extending upwardly from the well and having a valve seat; a container removably secured to the upper end of the conduit and sealing off said conduit; a check valve closure engageable with said seat to close the conduit when the container is removed therefrom; said container having a projection extending into the conduit for holding the closure off said seat when said container is secured to said conduit.

5. In a bearing lubricating system: a bearing structure; means forming a lubricant well for said structure; a conduit opening into the well below its normal lubricant level; a removable sealed lubricant reservoir connectible in fluid-tight relation to the conduit and adapted to contain lubricant having a level above the normal lubricant level in the well; valve means for closing said conduit; and a valve operating member on said reservoir engageable with said valve means to open said conduit when said reservoir is connected to said conduit.

6. In a bearing lubricating system: a bearing structure adapted to support a substantially horizontal shaft; a support for the bearing structure forming a lubricant well below the shaft; a pair of conduits extending upwardly from the well, one of said conduits extending on one side of a vertical plane passing through the axis of said shaft, and the other of said conduits extending on the other side of said vertical plane; and a sealed lubricant reservoir connectible in fluid-tight relation to the top of either of said conduits; the lower opening of the conduit to which said reservoir is connected being adapted to determine the level of lubricant in the well, the lower openings of said conduits being in constant communication with said well and disposed close to a vertical plane passing through the shaft axis.

WILLIAM M. EVANS.

REFERENCES CITED

The following references are of record in the file of this patent:

UNITED STATES PATENTS

| Number | Name | Date |
|---|---|---|
| 918,453 | Lanaux | Apr. 13, 1909 |
| 1,096,658 | Winters | May 12, 1914 |
| 1,122,607 | King | Dec. 29, 1914 |
| 1,256,020 | Hove | Feb. 12, 1918 |
| 1,433,613 | Harne | Oct. 31, 1922 |
| 2,242,262 | Ray | May 20, 1941 |

FOREIGN PATENTS

| Number | Country | Date |
|---|---|---|
| 800,604 | France | July 15, 1936 |